US011604647B2

(12) United States Patent
Sun et al.

(10) Patent No.: US 11,604,647 B2
(45) Date of Patent: Mar. 14, 2023

(54) MIXED PRECISION CAPABLE HARDWARE FOR TUNING A MACHINE LEARNING MODEL

(71) Applicant: International Business Machines Corporation, Armonk, NY (US)

(72) Inventors: Xiao Sun, Pleasantville, NY (US); Chia-Yu Chen, Westchester, NY (US); Naigang Wang, Ossining, NY (US); Jungwook Choi, Seoul (KR); Kailash Gopalakrishnan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 16/558,536

(22) Filed: Sep. 3, 2019

(65) Prior Publication Data

US 2021/0064372 A1    Mar. 4, 2021

(51) Int. Cl.
*G06F 17/18*      (2006.01)
*G06N 20/00*      (2019.01)
(Continued)

(52) U.S. Cl.
CPC .......... *G06F 9/30014* (2013.01); *G06F 7/483* (2013.01); *G06F 17/18* (2013.01); *G06N 5/04* (2013.01); *G06N 20/00* (2019.01)

(58) Field of Classification Search
CPC ...... G06F 9/30014; G06F 7/483; G06F 17/18; G06N 20/00; G06N 5/04
(Continued)

(56) References Cited

U.S. PATENT DOCUMENTS 8,161,268 B2   4/2012 Faraj
9,912,349 B1   3/2018 Ouyang et al.
(Continued)

FOREIGN PATENT DOCUMENTS

WO   2019009897 A1   1/2019

OTHER PUBLICATIONS

Jia, "Highly Scalable Deep Learning Training System with Mixed-Precision: Training ImageNet in Four Minutes" Jul. 30, 2018, Cornell University, arXiv:1807.11205, pp. 1-9, (publication year 2018).*

(Continued)

*Primary Examiner* — Hai Tao Sun
(74) *Attorney, Agent, or Firm* — Daniel Yeates; Ryan, Mason & Lewis, LLP

(57) ABSTRACT

An apparatus includes a memory and a processor coupled to the memory. The processor includes first and second sets of arithmetic units having first and second precision for floating-point computations, the second precision being lower than the first precision. The processor is configured to obtain a machine learning model trained in the first precision, to utilize the second set of arithmetic units to perform inference on input data, to utilize the first set of arithmetic units to generate feedback for updating parameters of the second set of arithmetic units based on the inference performed on the input data by the second set of arithmetic units, to tune parameters of the second set of arithmetic units based at least in part on the feedback generated by the first set of arithmetic units, and to utilize the second set of arithmetic units with the tuned parameters to generate inference results.

20 Claims, 8 Drawing Sheets

(51) Int. Cl.
*G06N 5/04* (2006.01)
*G06F 9/30* (2018.01)
*G06F 7/483* (2006.01)

(58) Field of Classification Search
USPC .......................................................... 706/12
See application file for complete search history.

(56) References Cited

U.S. PATENT DOCUMENTS

| | | | |
|---|---|---|---|
| 10,019,232 | B2 | 7/2018 | Nystad |
| 10,223,635 | B2 | 3/2019 | Annapureddy et al. |
| 2015/0356461 | A1 | 12/2015 | Vinyals et al. |
| 2017/0286830 | A1 | 10/2017 | El-Yaniv et al. |
| 2018/0211152 | A1 | 7/2018 | Migacz et al. |
| 2018/0307494 | A1* | 10/2018 | Ould-Ahmed-Vall .............. G06N 3/0454 |
| 2018/0307971 | A1 | 10/2018 | Sinha et al. |
| 2018/0308201 | A1 | 10/2018 | Appu et al. |
| 2018/0314940 | A1 | 11/2018 | Kundu et al. |
| 2018/0322382 | A1 | 11/2018 | Mellempudi et al. |
| 2018/0322607 | A1 | 11/2018 | Mellempudi et al. |
| 2019/0012559 | A1 | 1/2019 | Desappan et al. |
| 2019/0042544 | A1 | 2/2019 | Kashyap et al. |
| 2019/0042945 | A1 | 2/2019 | Majumdar et al. |
| 2019/0102671 | A1 | 4/2019 | Cohen et al. |
| 2019/0122100 | A1 | 4/2019 | Kang et al. |
| 2020/0134461 | A1* | 4/2020 | Chai .................... G06N 3/0635 |

OTHER PUBLICATIONS

Raghuraman Krishnamoorthi, "Quantizing Deep Convolutional Networks for Efficient Inference: A Whitepaper," arXiv preprint arXiv:1806.08342V1, Jun. 21, 2018, 36 pages.
S.R. Jain et al., "Trained Uniform Quantization for Accurate and Efficient Neural Network Inference on Fixed-Point Hardware," arXiv preprint arXiv:1903.08066V1, Mar. 19, 2019, 17 pages.
H. Park et al., "Training Deep Neural Network in Limited Precision," arXiv preprint arXiv:1810.05486V1, Oct. 12, 2018, 11 pages.
S.Yin et al., "Minimizing Area and Energy of Deep Learning Hardware Design Using Collective Low Precision and Structured Compression," 51st Asilomar Conference on Signals, Systems, and Computers, Oct. 1, 2017, pp. 1907-1911.
Andrew Gibiansky, "Bringing HPC Techniques to Deep Learning," Machine Learning, Feb. 21, 2017, 11 pages.
ruder.io, "An Overview of Gradient Descent Optimization Algorithms," www.ruder.io/optimizing-gradient-descent/, Jan. 19, 2016, 24 pages.
N. Wang et al., "Training Deep Neural Networks with 8-bit Floating Point Numbers," Proceedings of the 32nd International Conference on Neural Information Processing Systems (NIPS), Dec. 3-8, 2018, 10 pages.
P.C. Lin et al., "FloatSD: A New Weight Representation and Associated Update Method for Efficient Convolutional Neural Network Training," IEEE Journal on Emerging and Selected Topics in Circuits and Systems, Apr. 18, 2019, pp. 267-279, vol. 9, No. 2.
C. Case et al., "NVIDIA Apex: Tools for Easy Mixed-Precision Training in PyTorch," https://devblogs.nvidia.com/apex-pytorch-easy-mixed-precision-training/, Dec. 3, 2018, 9 pages.
S.K. Esser et al., "Learned Step Size Quantization," arXiv preprint arXiv:1902.08153v1, Feb. 21, 2019, 9 pages.

* cited by examiner

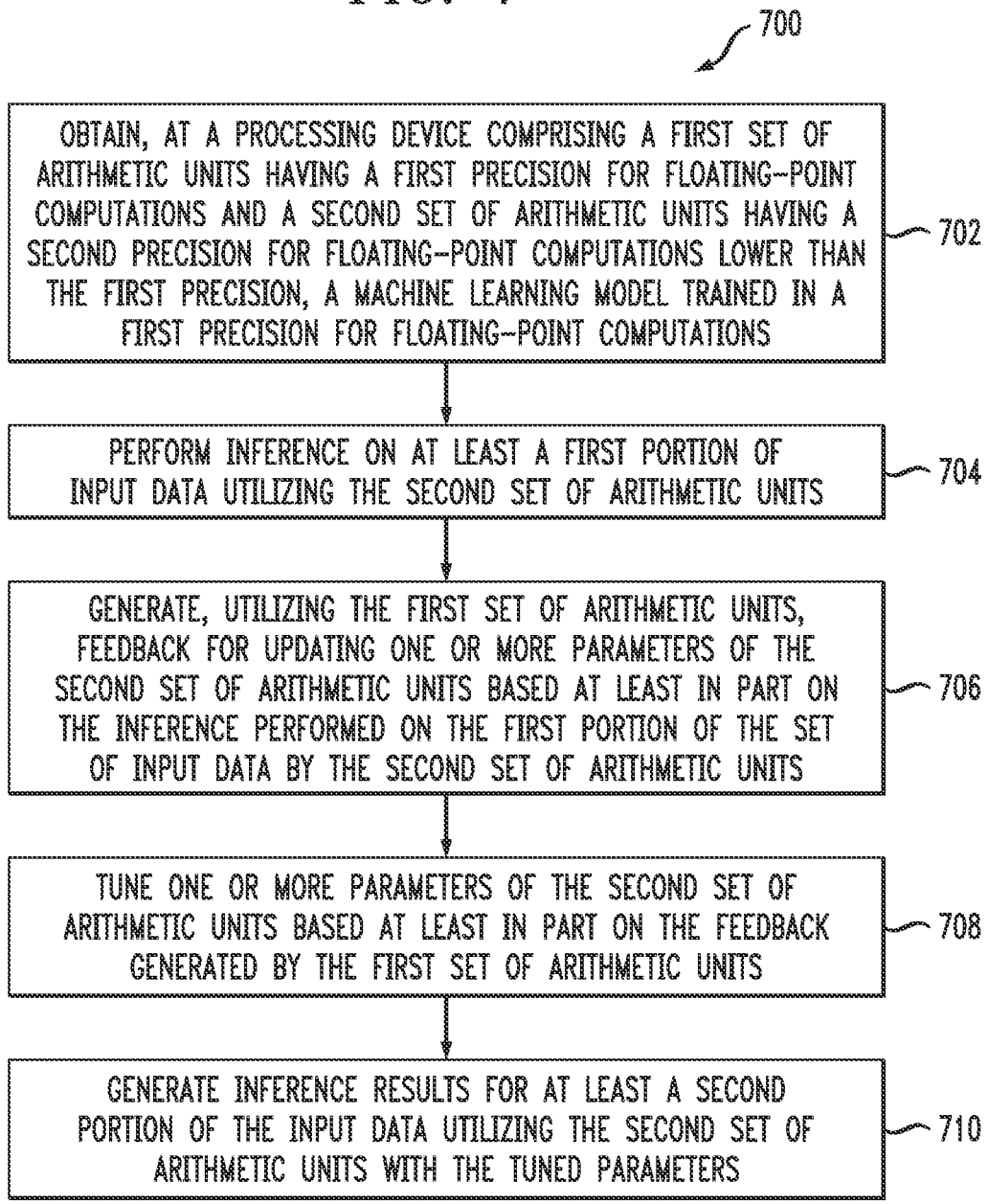

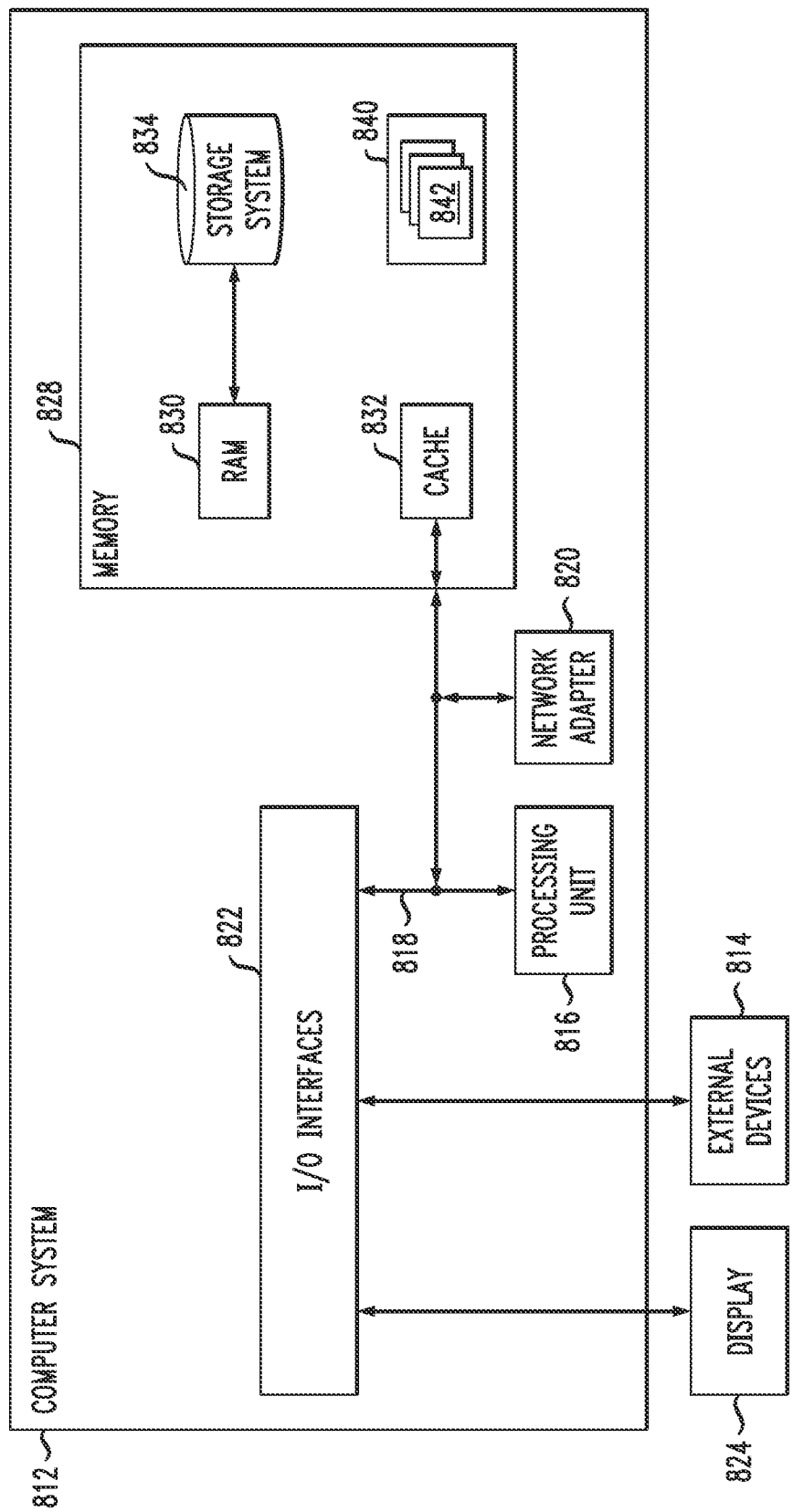

MIXED PRECISION CAPABLE HARDWARE FOR TUNING A MACHINE LEARNING MODEL

BACKGROUND

The present application relates to data processing, and more specifically, to mixed precision computing. Machine learning workloads may be computationally demanding, such as in performing various floating-point computations. The Institute of Electrical and Electronics Engineers (IEEE) Standard for Floating-Point Arithmetic (IEEE 754) is a widely used standard for floating-point computation. The IEEE 754 standard defines arithmetic formats, sets of binary and decimal floating-point data (e.g., finite numbers including signed zeros and subnormal numbers, infinities, and special "not a number" of NaN values), interchange formats, efficient and compact encodings for floating-point data, operations, exception handling, etc. Single precision floating-point format is a computer number format that occupies 32 bits in computer memory, and may be referred to as FP32. Double precision floating-point format is a computer number format that occupies 64 bits in computer memory and may be referred to as FP64. FP32 and FP64 are structurally complex high precision formats that may be prohibitively resource-intensive to use for certain tasks such as those required for machine learning workloads.

SUMMARY

Embodiments of the invention provide techniques for tuning machine learning models using hardware configured with mixed precision capability.

In one embodiment, an apparatus comprises a memory and a processor coupled to the memory. The processor comprises a first set of arithmetic units having a first precision for floating-point computations and a second set of arithmetic units having a second precision for floating-point computations, the second precision being lower than the first precision. The processor is configured to obtain a machine learning model trained in the first precision, to utilize the second set of arithmetic units to perform inference on at least a first portion of input data, to utilize the first set of arithmetic units to generate feedback for updating one or more parameters of the second set of arithmetic units based at least in part on the inference performed on the first portion of the set of input data by the second set of arithmetic units, to tune one or more parameters of the second set of arithmetic units based at least in part on the feedback generated by the first set of arithmetic units, and to utilize the second set of arithmetic units with the tuned parameters to generate inference results for at least a second portion of the input data.

In another embodiment, a method comprises obtaining, in a memory of a processing device comprising a first set of arithmetic units having a first precision for floating-point computations and a second set of arithmetic units having a second precision for floating-point computations, a machine learning model trained in the first precision, the second precision being lower than the first precision. The method also comprises performing inference on at least a first portion of input data utilizing the second set of arithmetic units and generating, utilizing the first set of arithmetic units, feedback for updating one or more parameters of the second set of arithmetic units based at least in part on the inference performed on the portion of the set of input data by the second set of arithmetic units. The method further comprises tuning one or more parameters of the second set of arithmetic units based at least in part on the feedback generated by the first set of arithmetic units and generating inference results for at least a second portion of the input data utilizing the second set of arithmetic units with the tuned parameters.

In another embodiment, a system comprises a first set of arithmetic units having a first precision for floating-point computations, a second set of arithmetic units coupled to the first set of arithmetic units, the second set of arithmetic units having a second precision for floating-point computations, the second precision being lower than the first precision, and a memory coupled to the second set of arithmetic units. The second set of arithmetic units are configured to perform inference on input data stored in the memory utilizing a copy of a machine learning model obtained from the memory, the machine learning model being trained for the first precision for floating-point computations. The first set of arithmetic units are configured to tune one or more parameters of the second set of arithmetic units based at least in part on inference results generated by the second set of arithmetic units for at least a portion of the input data.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 7 depicts a process for tuning a machine learning model using mixed precision capable hardware, according to an exemplary embodiment of the present invention.

FIG. 8 depicts a computer system in accordance with which one or more components/steps of techniques of the invention may be implemented, according to an exemplary embodiment of the invention.

DETAILED DESCRIPTION

Figure 1:
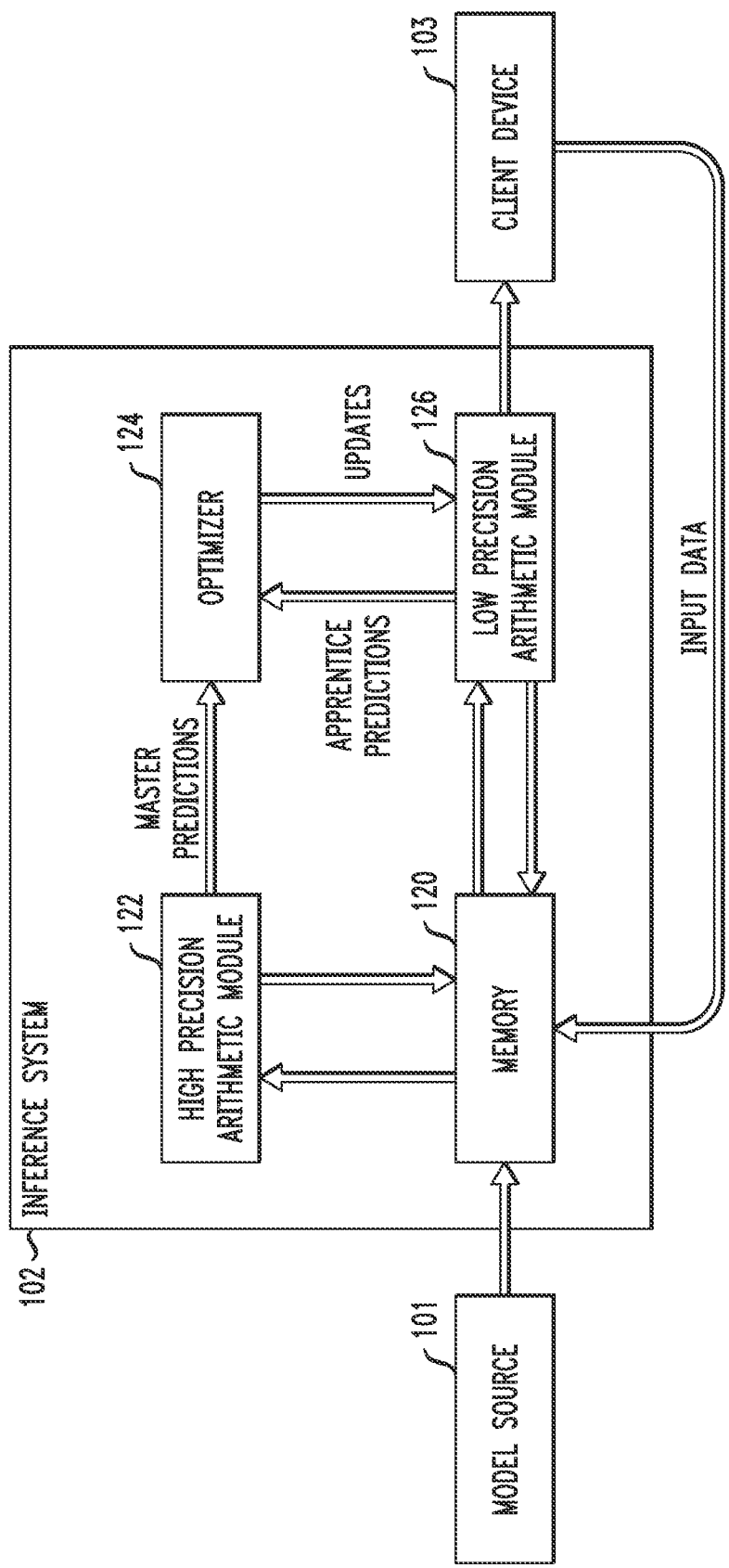
FIG. 1 depicts a machine learning inference system implemented using hardware with mixed precision capability, according to an exemplary embodiment of the present invention.

Illustrative embodiments of the invention may be described herein in the context of illustrative methods, systems and devices for tuning machine learning models using hardware with mixed precision capability. However, it is to be understood that embodiments of the invention are not limited to the illustrative methods, systems and devices but instead are more broadly applicable to other suitable methods, systems and devices.

A floating-point (FP) representation of a given number includes three parts: a significand (sometimes referred to as a mantissa) containing the number's digits, an exponent that sets the location where the decimal (or binary) point is placed relative to the beginning of the significand, where negative exponents represent numbers that are very small (i.e. close to zero); and a sign (positive or negative) associated with the number.

An arithmetic logic unit (ALU) is a combinational digital electronic circuit that performs arithmetic and bitwise operations on integer binary numbers.

A floating-point unit (FPU) is a processor or part of a processor, implemented as a hardware circuit, which performs FP calculations. FPUs may be standalone processors, or they may be integrated inside a central processing unit (CPU) or other device such as a graphics processing unit (GPU). Integrated FPUs may be very complex, capable of performing high-precision FP computations while ensuring compliance with rules governing such computations (e.g., the rules set forth in the IEEE 754 standard).

Machine learning workloads, as noted above, may be computationally demanding. Machine learning workloads include the configuration and training of machine learning models such as deep learning neural networks (DNNs). Each iteration or cycle of training a DNN may require many FP computations, and the number of FP computations required to train the DNN may scale exponentially with the number of nodes in the DNN. Specialized hardware accelerators may be used to provide large throughput density for floating-point computations, both in terms of area (computation throughput per square millimeter of processor space) and power (computation throughput per watt of electrical power consumed).

Some FPUs have a fixed bit-width size in terms of the number of binary bits that may be used to represent a number in a floating-point format (referred to hereinafter as a "format" or "floating-point format"). FPU bit-width size formats include but are not limited to 8-bit, 16-bit, 32-bit, 64-bit and 128-bit formats. Typically, the larger the bit-width size format of an FPU, the more complex and larger the FPU is in terms of physical size of the semiconductor fabricated circuit. In addition, a larger and more complex FPU also consumes more electrical power and typically takes a longer amount of time to produce an output for an FP computation.

In some cases, it is desired to train a machine learning model in "high" precision, but perform actual inference using the machine learning model in "low" precision, where "high" and "low" refer to the bit size of the FP computations involved. Some floating-point formats result in long compute times, expensive computations in terms of power and other computing resources, and complex and large hardware microarchitectures that must be used for machine learning and other types of cognitive computing workloads, including but not limited to training neural networks. For example, a microarchitecture that uses 128-bit representation must have registers large enough to store such representations as compared to a microarchitecture that is designed to use only a 32-bit representation. Generally, higher precision is desired for machine learning model training. 16-bit format, in some cases, is considered the lowest usable precision for machine learning model training.

Double precision (e.g., 64-bit) and single precision (e.g., 32-bit) format representations are structurally complex, and may be prohibitively resource-intensive for use in machine learning or other types of cognitive computing workloads. One way to improve both area and power consumption metrics for cognitive computing workloads is to use small bit-width formats (e.g., "low" precision) to perform as many of the FP computations as possible.

It should be noted that there is no specific requirement regarding the bit sizes which may be considered "high" and "low" precisions, and that these relative terms indicate that training is performed using relatively higher precision while inference is performed using relatively lower precision. In the description below, it may be assumed that the "high" precision FP computations are 32-bit FP computations while the "low" precision FP computations are 8-bit or 16-bit FP computations. It should be appreciated, however that other bit width sizes may be used in other cases. For example, in a case where the "high" precision FP computations are 64-bit, the "low" precision FP computations may be 32-bit. Various other examples are possible.

It is desired to provide techniques for low precision inference using machine learning models, where the machine learning models are trained in higher precision. Such approaches, however, suffer from degradation in accuracy. The reduced precision causes uncertainties and errors, because the model is not trained for the lower precision. While it is possible to re-train the low precision model to recover the lost accuracy, this is time-consuming and requires the training data to be retained. Further, the training data may not always be available for regenerating or retraining the lower precision model.

Illustrative embodiments provide techniques that enable such low precision inference with higher precision training while mitigating such degradation in accuracy. Advantageously, embodiments do so while avoiding requiring training data or complicated quantization schemes, and are not limited to fixed-point computations.

Some embodiments provide an architecture for receiving a machine learning model in a high precision format and inferencing in a lower precision format with little or no degradation. For example, a trained machine learning model may be downloaded or otherwise obtained in FP32 precision, and inferencing may be performed on the obtained model in a Bfloat16 (Brain Floating Point) format (e.g., FP16).

Hardware with mixed precision capabilities is provided to fine tune the obtained model after reducing its precision, without requiring a training dataset. The trained machine learning model in FP32 can be inferenced in this hardware, although in inferior speed or efficiency, as a "master" model to generate a set of output. Meanwhile, the hardware can also use a more efficient low precision process to inference with an "apprentice" model and generate another set of output. The mixed precision capable hardware can then use differences between the high precision and low precision output to update weights and other parameters of the apprentice model. No labeled training data is required, just the input data provided by a user which is assumed to be available when the hardware is in use.

The trained machine learning model (e.g., in FP32 or other relatively high precision) can also or alternatively be inferenced in the lower precision apprentice model possibly without the master or high precision model. Normalization layers, such as batch normalization (BatchNorm or BN) including a running mean and running variance may be updated with new data inference in the low precision model. This significantly improves the accuracy by using the matching BN statistics, as compared with using high precision (e.g., FP32) BN statistics for data inference in lower precision (e.g., FP8, 8-bit integer (INT8), etc.), which has significant degradation.

Some embodiments provide an online tuning functionality, that can automatically perform the above to improve performance while the hardware is in use. For example, an inference system with a back-staged module that inferences all incoming tasks can analyze the difference from the high precision (e.g., FP32) model's prediction and fine-tunes the model for low precision inference. The system can also roll back to a previous model if the updates do not reduce the difference from the high precision model's prediction in future use.

FIG. 1 shows a machine learning inference system 102, implemented using hardware with mixed precision capability. The machine learning inference system 102 is configured to receive, from model source 101 (e.g., a server, an Internet source, a model supplier, etc.) a trained "high" precision model. The machine learning system 102 stores the trained model in memory 120. A high precision arithmetic module 122 is configured to obtain the trained model from the memory 120. The high precision arithmetic module 122 may include one or more FPUs, arithmetic logic units (ALUs) or other hardware capable of performing high precision computations (e.g., FP computations at the precision of the trained model obtained from model source 101). The high precision arithmetic module 122 implements a "master" model that provides "master" predictions to the optimizer 124.

The inference system 102 also includes a low precision arithmetic module 126 configured to obtain the trained model from memory 120. The low precision arithmetic module 126, similar to the high precision arithmetic module 122, may include one or more FPUs, ALUs or other hardware capable of performing FP or integer computations. The low precision arithmetic module 126, however, is assumed to perform the FP computations at a lower precision than that at which the model obtained from model source 101 was trained. If the trained model from model source 101 was trained at 32-bit, for example, the low precision arithmetic module 126 may perform FP computations at 16-bit (FP16).

The low precision arithmetic module 126 provides "apprentice" predictions to the optimizer 124. The optimizer 124 compares the master predictions from high precision arithmetic module 122 with the apprentice predictions from the low precision arithmetic module 126. Based on the comparison, the optimizer 124 generates updates to the high precision trained model that is used by the low precision arithmetic module 126 for generating predictions (e.g., to reduce the difference between the "master" and "apprentice" predictions, such that the "apprentice" predictions match the "master" predictions). This fine tuning of the model used by the low precision arithmetic module 126 may be performed prior to, or during normal operation (e.g., where the low precision arithmetic module 126 provides fast and efficient predictions to a client device 103).

Both the "master" and "apprentice" predictions, for example, may provide an output with a distribution of probability of correct classification for the input data. By comparing the results or classification probabilities, the optimizer 124 can compute and treat the differences between the two as error that is back-propagated to the low precision model and to perform fine-tuning of the weights used in the low precision model such that the output of the low precision arithmetic module 126 more closely matches the output of the high precision arithmetic module 122.

The client device 103, which may be operated by a user or other client that performs computations on the trained model, provides input data to the memory 120. Such input data is used by the high precision arithmetic module 122 to generate the master predictions, and is used by the low precision arithmetic module 126 to generate the apprentice predictions. The low precision arithmetic module 126, in addition to providing the apprentice predictions to the optimizer 124, also provides the apprentice predictions to the client device 103.

Figure 2:
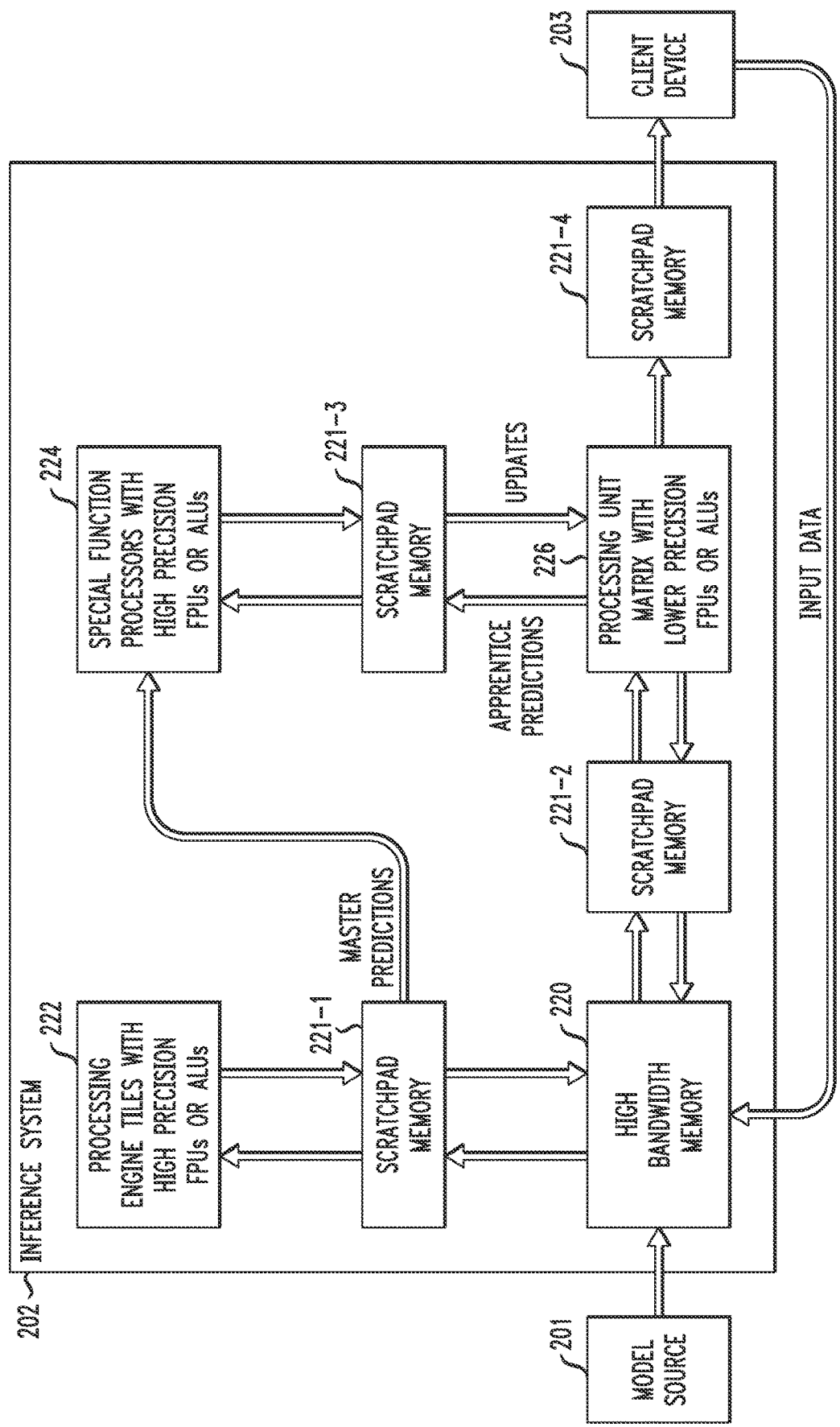
FIG. 2 depicts another machine learning inference system implemented using hardware with mixed precision capability, according to an exemplary embodiment of the present invention.

FIG. 2 shows a machine learning inference system 202 coupled to a model source 201 and a client device 203, which are similar to the model source 101 and client device 103 described above with respect to FIG. 1. The inference system 202 includes a memory with high bandwidth memory 220, such as 3D-stacked synchronous dynamic random-access memory (SDRAM).

The inference system 202 further includes a set of processing engine tiles 222 with high precision FPUs or ALUs, special function processors 224 with high precision FPUs or ALUs, and a processing unit matrix 226 with lower precision FPUs or ALUs.

The processing engine tiles 222, also referred to as tile processors 222, may be implemented using arrays of tiles each providing one or multiple compute units and registers, and share data read/write caches. The tiled processors have links to each other to pass input or partially processed data from one to another for efficient computation and maximum data-reuse. In some embodiments, the tile processors 222 are each configured with $32b$ FPU or ALU compute units (e.g., "high" precision FPUs or ALUs, where the trained model obtained from model source 201 is assumed to be a 32-bit model).

The special function processors 224 are an example implementation of the optimizer 124, and may include high precision FPUs or ALUs (e.g., $32b$ FPUs or ALUs). The special function processors, in some embodiments, are implemented using arrays of computing cores each providing one or multiple computing units for executing special functions, such as exponential, logarithmic, etc. functions.

In some embodiments, the high precision processing tiles 222 and special function processors 224 are implemented by a CPU, GPU or other hardware.

The processing unit matrix 226 includes lower precision FPUs or ALUs (e.g., $16b$ FPUs or ALUs). The processing unit matrix 226 may be implemented by 2D arrays of computing units each providing one or multiple compute units and registers, and shares data read/write caches. Each of the compute units may also have links to pass input and partially computed data in a certain dataflow, such as systolic dataflow, to maximize data-reuse and compute efficiency.

Similar to the inference system 102, in the inference system 202 various data is exchanged between the high bandwidth memory 220, tile processors 222, special function processors 224 and processing unit matrix 226. For example, "master" predictions generated in the tile processors 222 and "apprentice" predictions generated in the processing unit matrix 226 are provided to the special function processors 224. The special function processors 224 provide updates (e.g., to the trained model used for fast and efficient inference) to the processing unit matrix 226. These updates may include updates to model parameters, weights, etc., which reduce or eliminate differences between the master and apprentice predictions. The processing unit matrix 226 also provides the apprentice predictions to the client device 203.

As illustrated in FIG. 2, a set of scratchpad memories 221-1, 221-2, 221-3 and 221-4 (collectively, scratchpad memory 221) facilitate such communication and exchange of data among the high bandwidth memory 220, tile processors 222, special function processors 224 and processing unit matrix 226. Scratchpad memory 221 provides a high-speed internal memory, used for temporary storage of the various data exchanged as described above. Scratchpad memory can be implemented using static random-access memory (SRAM), embedded dynamic random-access memory (DRAM), spin-transfer torque magnetic random-access memory (STT-MRAM), etc.

Figure 3:
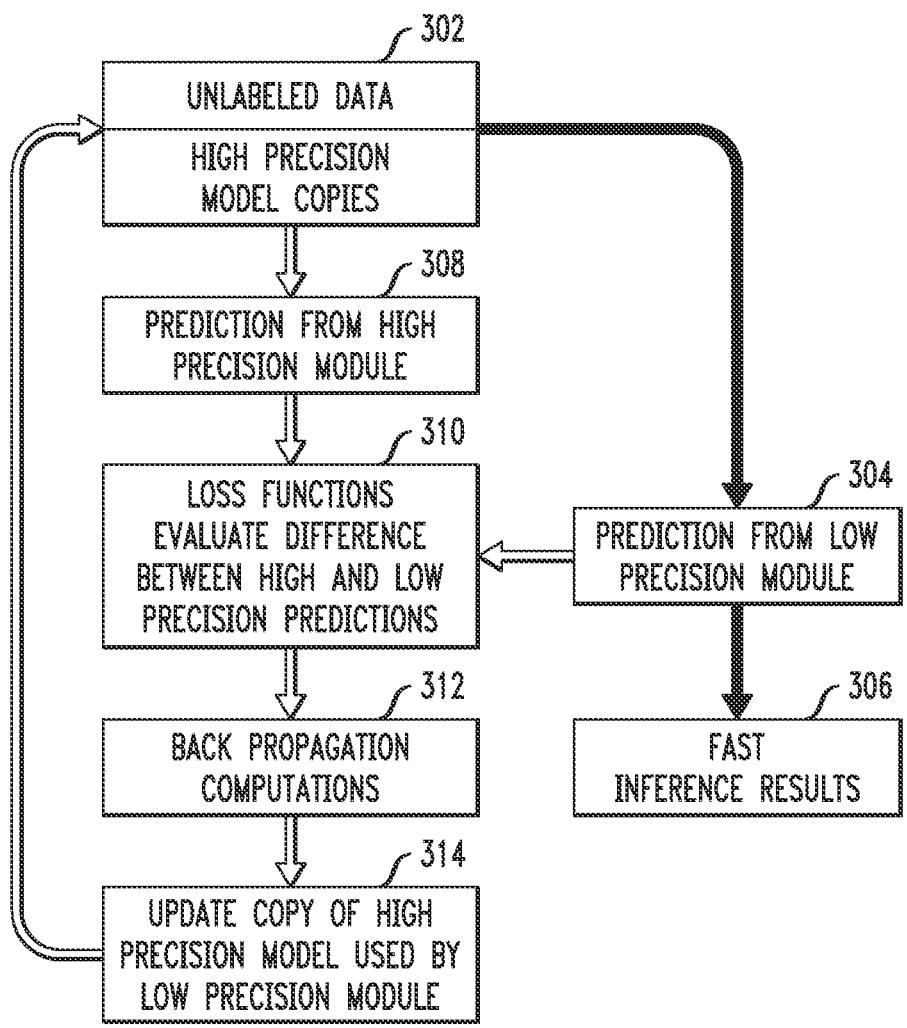
FIG. 3 depicts a process for tuning a machine learning model using the FIG. 2 machine learning inference system, according to an exemplary embodiment of the present invention.

FIG. 3 shows a process for tuning a machine learning model using the FIG. 1 or FIG. 2 inference system. In step 302, unlabeled data is received, along with a trained model assumed to be in the form of high precision model copies. The trained model is obtained from the model source 101/201, while the unlabeled or input data is received from client device 103/203.

In step 304, predictions (e.g., "apprentice" predictions) are obtained from the low precision module (e.g., low precision arithmetic module 126, processing unit matrix 226). During normal use (e.g., after the low precision module has been fine-tuned), such predictions provide fast and efficient inference results in step 306. The normal operation is thus illustrated using the dark shaded arrows. The fine-tuning process is illustrated using the white arrows. It should be appreciated that the fine-tuning process, in some embodiments, is continuous (e.g., the low precision module may be fine-tuned both before and during use, to improve inference results).

In step 308, predictions (e.g., "master" predictions) are obtained from the high precision module (e.g., high precision arithmetic module 122, tile processors 222) using the unlabeled data. The predictions from steps 304 and 308 are used in step 310, where loss functions evaluate differences between the high and low precision predictions (e.g., between the "master" and "apprentice" predictions). In some embodiments, the loss functions are L1 difference (e.g., the average of the absolute difference between "master" and "apprentice" output over all classes, or mean-square-error among all classes).

The process continues in step 312 with back propagation computations. The back propagation computations may be a common back propagation process in deep neural network (DNN) training, except that the loss function is obtained as described above (e.g., based on the high and low precision inferences). In step 314, the copy of the high precision model used by the low precision module (e.g., in step 304) is updated based on the results of evaluating the loss functions and the back propagation computations, same as the weight update in DNN training.

Figure 4:
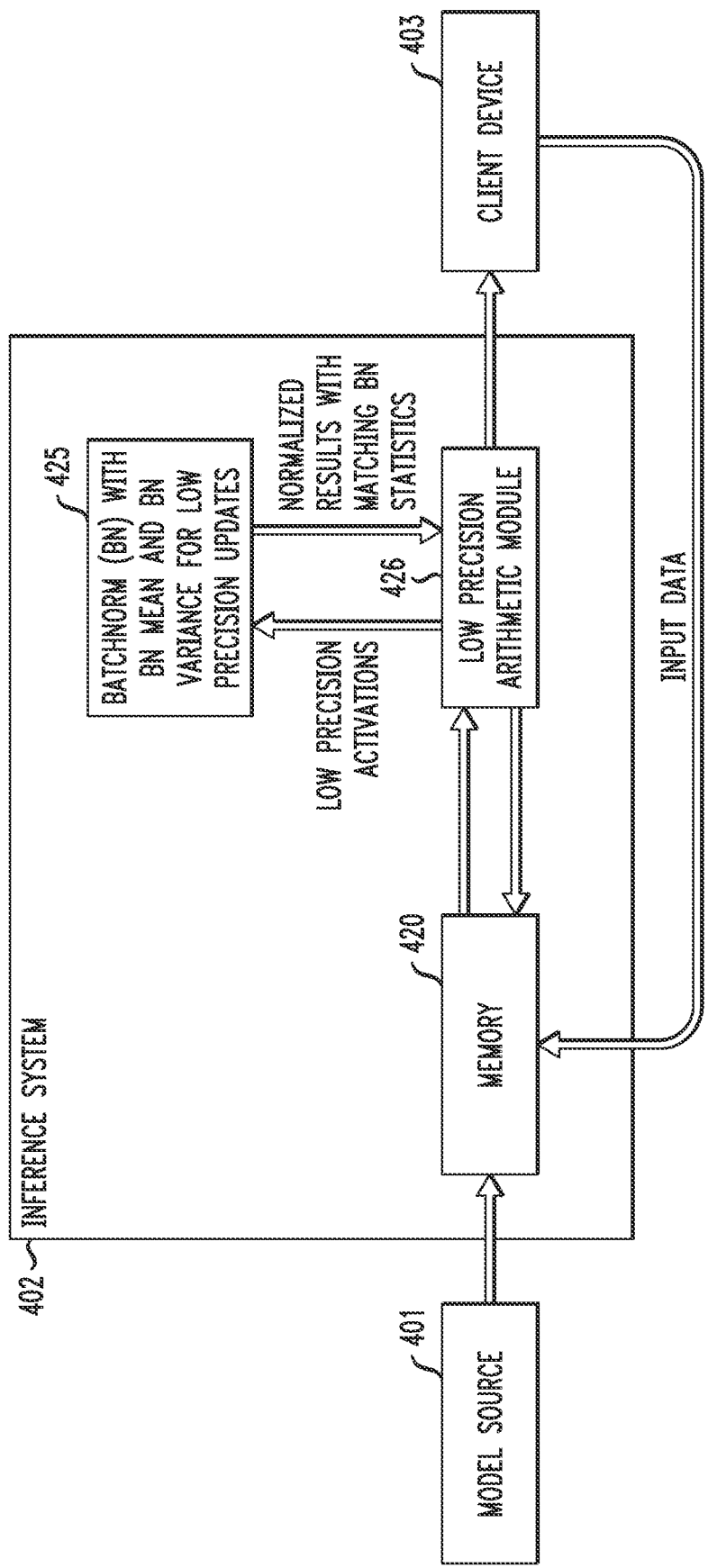
FIG. 4 depicts another machine learning inference system implemented using hardware with mixed precision capability, according to an exemplary embodiment of the present invention.

FIG. 4 shows another machine learning inference system 402. The inference system 402 is coupled to a model source 401 and client device 403, similar to the model sources 101/201 and client devices 103/203 described above. The inference system 402 includes a memory 420 that stores a trained model from model source 401, as well as input data from the client device 403.

The inference system 402 includes a low precision arithmetic module 426, similar to the low precision arithmetic module 126 and processing unit matrix 226. The inference system 402, rather than including a high precision arithmetic module and optimizer (as in inference systems 102 and 202) instead includes a parameterized special function, such as Batch Normalization (BatchNorm or BN) module 425, also referred to more generally as a normalization module 425.

The normalization module 425 is configured to receive low precision activations from the low prevision arithmetic module 426, and to compute running BN mean and BN variance for updating the low precision arithmetic module 426. The normalization module 425 provides normalized results with matching BN statistics to the low precision arithmetic module 426. Low precision predictions from the low precision arithmetic module 426 are also provided to the client device 403.

The normalization module 425 implements normalization layers (e.g., BN layers) for the machine learning model. BN layers take the input and normalize the input so that the mean becomes zero, and the variance becomes 1. The trained model obtained from model source 401 is assumed to have a certain mean and variance which could be used. The mean and variance of the trained model, however, can result in large mismatches because use of the low precision arithmetic module 426 changes the mean and variance. The output or activations may be subtracted by the mismatched mean and divided by the mismatched standard deviation yielding a compromise of the benefits of BN layers and thus degradation in inference accuracy. The normalization module 425, in some embodiments, updates the BN layer for the low precision model to improve accuracy (e.g., by updating the BN mean and variance using low precision activation during inference, accuracy is improved). It should be noted that in some embodiments this requires no back propagation or changing of model weights, just normalization criteria and values.

Figure 5:
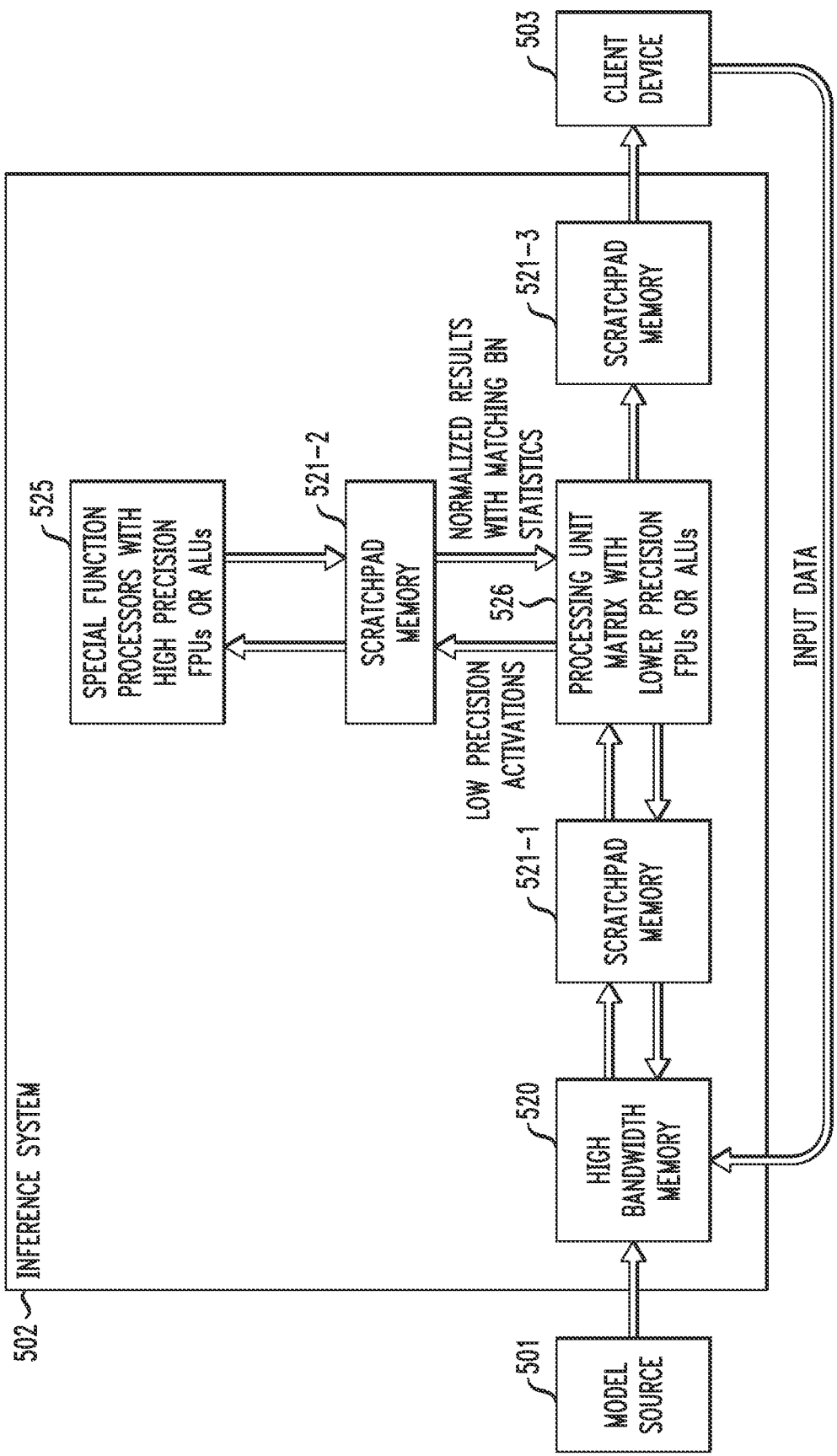
FIG. 5 depicts another machine learning inference system implemented using hardware with mixed precision capability, according to an exemplary embodiment of the present invention.

FIG. 5 shows a machine learning inference system 502 coupled to a model source 501 and a client device 503, which are similar to the model sources 101/201/401 and client devices 103/203/403 described above. The inference system 502 also includes a high bandwidth memory 520, similar to the high bandwidth memory 220 described above.

The inference system 502 further includes a processing unit matrix 526 with low precision FPUs or ALUs, similar to the processing unit matrix 226 described above, and special function processors 525. The special function processors 525 include high precision FPUs or ALUs (e.g., 32b FPUs or ALUs) and implement the parameterized special function such as BatchNorm described above with respect to normalization module 425.

Similar to the inference system 202, the inference system 502 includes a set of scratchpad memories 521-1, 521-2 and 521-3 (collectively, scratchpad memory 521) that facilitates data exchange among the high bandwidth memory 520, processing unit matrix 526 and special function processors 525.

Figure 6:
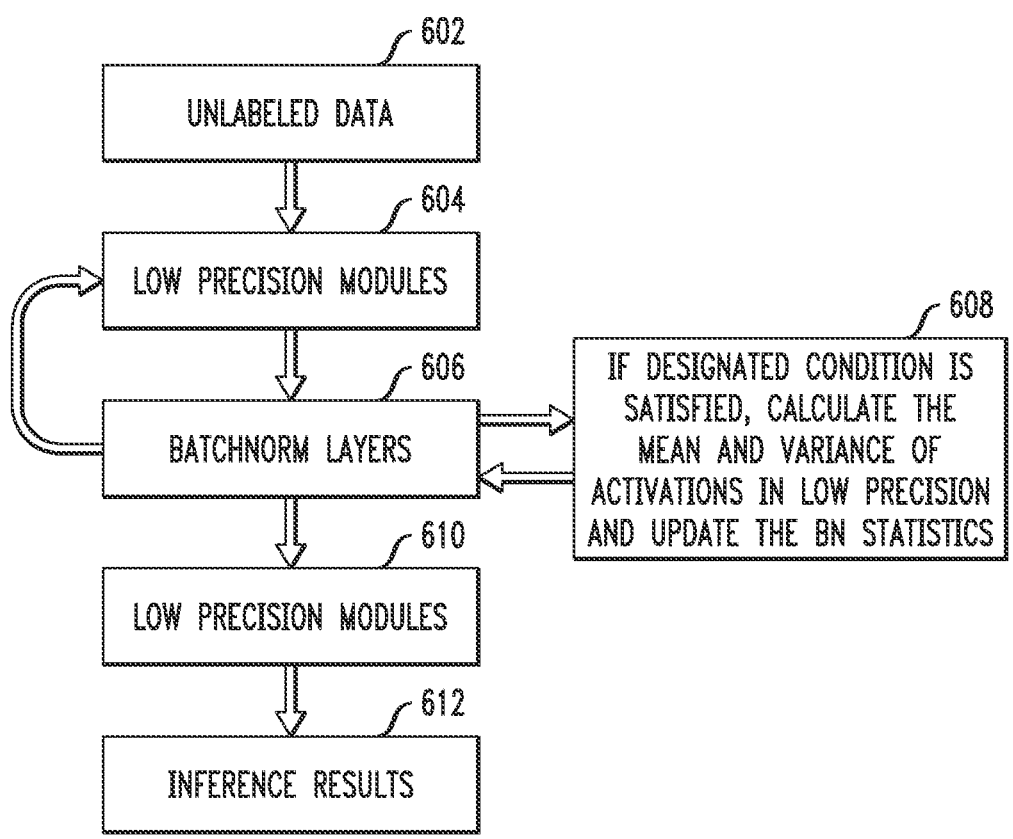
FIG. 6 depicts a process for tuning a machine learning model using the FIG. 5 machine learning inference system, according to an exemplary embodiment of the present invention.

FIG. 6 shows a process for tuning a machine learning model using the FIG. 4 or FIG. 5 inference system. In step 602, unlabeled data is received (e.g., input data from client device 403 or client device 503). The unlabeled data is provided to the low precision modules (e.g., low precision arithmetic module 426, processing unit matrix 526) in step 604. It should be noted that, although described in this example using unlabeled or input data, training data may also be used to update the low precision modules. The low precision modules provide activations to the parameterized special function implemented as BN layers in step 606. The BN layers determine whether one or more designated conditions are satisfied (e.g., whether the accuracy is significantly lower than that in the high precision inference) and the BN layers calculate the mean and variance of the low precision activations in step 608 to update the BN statistics. In some embodiments, the designated condition is a user prompt.

When the condition is satisfied, inference may be performed on some percentage or portion of the available data to determine mean and variance (e.g., performing X number of runs using the available data, which may be unlabeled input data or training data if available). Based on the level of degradation from the high precision inference accuracy, the BN statistics are updated to set normalization criteria and values in the low precision modules.

The updated BN statistics are provided as feedback to the low precision modules in step 604. An inference system may include many layers of low precision modules, followed by high precision BN layers (e.g., as illustrated in FIGS. 4 and 5). The low precision modules in step 610 are assumed to utilize the updated BN statistics to generate fast and efficient inference results in step 612.

It should be appreciated that, in some embodiments, an inference system may combine features described above in the context of FIGS. 1-3 with features described above in the context of FIGS. 4-6. In other words, some embodiments may tune a machine learning model by both: (i) comparing "master" and "apprentice" predictions from high and low precision modules and updating weights, biases or other parameters of a copy of a machine learning model (trained with the high precision) used by the low precision module to reduce the difference between the "master" and "apprentice" predictions; and (ii) generating normalization statistics based on activations in the low precision module while performing inference and using the generated normalization statistics to update normalization criteria and values used in normalization layers of the copy of the machine learning model used by the low precision module.

FIG. 7 depicts a process 700 for tuning a machine learning model using mixed precision capable hardware. The mixed precision capable hardware, in some embodiments, comprises a processing device having a memory and a processor comprising at least first and second sets of arithmetic units, where the first set of arithmetic units has a first precision for FP computations and the second set of arithmetic units has a second precision for FP computations less than the first precision. The mixed precision capable hardware, in other embodiments, is a system with memory and at least first and second sets of arithmetic units having the first and second precisions for FP computations, respectively. The first and second sets of arithmetic units may comprise FPUs, ALUs, etc. The various FPUs, ALUs or other arithmetic units may be part of or arranged in tile processors, in special function processors, in a processing unit matrix, etc. as described above in conjunction with FIGS. 1-6. The first precision may comprise FP32 or higher, and the second precision may comprise FP16 or lower.

In step 702, a machine learning model trained in the first precision is obtained. Inference is performed in step 704 on at least a first portion of input data utilizing the second set of arithmetic units. The first set of arithmetic units are utilized in step 706 to generate feedback for updating one or more parameters of the second set of arithmetic units based at least in part on the inference performed in step 704. In step 708, one or more parameters of the second set of arithmetic units are tuned based at least in part on the feedback generated in step 706. Inference results are generated in step 710 for at least a second portion of the input data, utilizing the second set of arithmetic units with the tuned parameters.

In some embodiments, the processing device or system further comprises a third set of arithmetic units having the first precision for floating-point computations, and the process 700 further includes utilizing the third set of arithmetic units to perform inference on the first portion of the input data. In such cases, step 706 may include determining a difference between (i) a first set of predictions obtained by performing inference on the first portion of the input data with the first set of arithmetic units and (ii) a second set of predictions obtained by performing inference on the first portion of the input data with the third set of arithmetic units, and identifying a set of updates to one or more parameters of the second set of arithmetic units to reduce the difference between (i) and (ii), the one or more parameters comprising weight and bias values for a copy of the trained machine learning model utilized by the second set of arithmetic units.

In some embodiments, step 706 further or alternatively comprises obtaining a set of activations in a copy of the trained machine learning model utilized by the second set of arithmetic units to perform inference on the first portion of the input data, determining at least one of a mean and a variance in the obtained set of activations, generating normalization statistics based at least in part on the determined mean and variance, and identifying a set of updates to one or more parameters of the second set of arithmetic units based on the generated normalization statistics, the one or more parameters comprising normalization criteria and values for one or more normalization layers of the copy of the trained machine learning model utilized by the second set of arithmetic units.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a memory;
   a processor coupled to the memory;
   the processor comprising a first set of arithmetic units having a first precision for floating-point computations and a second set of arithmetic units having a second precision for floating-point computations, the second precision being lower than the first precision;
   the processor being configured:
      to obtain a machine learning model trained in the first precision;
      to utilize the second set of arithmetic units to perform inference on at least a first portion of input data;
      to utilize the first set of arithmetic units to generate feedback for updating one or more parameters of the second set of arithmetic units based at least in part on determining a difference between (i) a first set of predictions obtained by performing inference on the first portion of the input data with the second set of arithmetic units and (ii) a second set of predictions obtained by performing inference on the first portion of the input data with one or more arithmetic units having the first precision;
      to tune one or more parameters of the second set of arithmetic units based at least in part on the feedback generated by the first set of arithmetic units; and
      to utilize the second set of arithmetic units with the tuned parameters to generate inference results for at least a second portion of the input data;
   wherein utilizing the first set of arithmetic units to generate the feedback for updating the one or more parameters of the second set of arithmetic units comprises:
      obtaining a set of activations in a copy of the trained machine learning model utilized by the second set of arithmetic units to perform inference on the first portion of the input data;
      determining at least one of a mean and a variance in the obtained set of activations;
      generating normalization statistics based at least in part on the determined mean and variance; and
      identifying a set of updates to one or more parameters of the second set of arithmetic units based on the generated normalization statistics, the one or more parameters comprising normalization criteria and values for one or more normalization layers of the copy of the trained machine learning model utilized by the second set of arithmetic units.

2. The apparatus of claim 1, wherein at least one of the first set of arithmetic units and the second set of arithmetic units comprise respective floating-point units.

3. The apparatus of claim 1, wherein at least one of the first set of arithmetic units and the second set of arithmetic units comprise respective algorithmic logic units.

4. The apparatus of claim 1, wherein the first precision comprises 32-bit or higher floating-point computations, and the second precision comprises 16-bit or lower floating-point computations.

5. The apparatus of claim 1, wherein the processor further comprises a third set of arithmetic units having the first precision for floating-point computations, the processor being further configured to utilize the third set of arithmetic units to obtain the second set of predictions.

6. The apparatus of claim 1, wherein utilizing the first set of arithmetic units to generate the feedback for updating the one or more parameters of the second set of arithmetic units further comprises:
   identifying the set of updates to the one or more parameters of the second set of arithmetic units to reduce the difference between (i) the first set of predictions obtained by performing inference on the first portion of the input data with the second set of arithmetic units and (ii) the second set of predictions obtained by performing inference on the first portion of the input data with the one or more arithmetic units having the first precision, the one or more parameters further comprising weight and bias values for a copy of the trained machine learning model utilized by the second set of arithmetic units.

7. The apparatus of claim 6, wherein identifying the set of updates to the one or more parameters of the second set of arithmetic units comprises performing back-propagation to the copy of the trained machine learning model utilized by the second set of arithmetic units.

8. The apparatus of claim 1, wherein the one or more normalization layers comprise batch normalization layers and the generated normalization statistics comprise batch normalization statistics.

9. The apparatus of claim 1, wherein identifying the set of updates to the one or more parameters of the second set of arithmetic units comprises selecting normalization criteria and values for the one or more normalization layers to achieve a designated mean and a designated variance while performing inference with the second set of arithmetic units.

10. The apparatus of claim 9, wherein the designated mean comprises 0 and the designated variance comprises 1.

11. The apparatus of claim 1, further comprising scratch-pad memory coupling the memory, the first set of arithmetic units and the second set of arithmetic units.

12. A method comprising:
   obtaining, in a memory of a processing device comprising a first set of arithmetic units having a first precision for floating-point computations and a second set of arithmetic units having a second precision for floating-point computations, a machine learning model trained in the first precision, the second precision being lower than the first precision;
   performing inference on at least a first portion of input data utilizing the second set of arithmetic units;
   generating, utilizing the first set of arithmetic units, feedback for updating one or more parameters of the second set of arithmetic units based at least in part on determining a difference between (i) a first set of predictions obtained by performing inference on the first portion of the input data with the second set of arithmetic units and (ii) a second set of predictions obtained by performing inference on the first portion of the input data with one or more arithmetic units having the first precision;
   tuning one or more parameters of the second set of arithmetic units based at least in part on the feedback generated by the first set of arithmetic units; and
   generating inference results for at least a second portion of the input data utilizing the second set of arithmetic units with the tuned parameters;
   wherein utilizing the first set of arithmetic units to generate the feedback for updating the one or more parameters of the second set of arithmetic units comprises identifying a set of updates to one or more parameters of the second set of arithmetic units to reduce the difference between (i) the first set of predictions obtained by performing inference on the first portion of the input data with the second set of arithmetic units and (ii) the second set of predictions obtained by performing inference on the first portion of the input data with the one or more arithmetic units having the first precision, the one or more parameters comprising weight and bias values for a copy of the trained machine learning model utilized by the second set of arithmetic units.

13. The method of claim 12, wherein the first precision comprises 32-bit or higher floating-point computations, and the second precision comprises 16-bit or lower floating-point computations.

14. The method of claim 12, wherein utilizing the first set of arithmetic units to generate the feedback for updating the one or more parameters of the second set of arithmetic units further comprises:
   obtaining a set of activations in a copy of the trained machine learning model utilized by the second set of arithmetic units to perform inference on the first portion of the input data;
   determining at least one of a mean and a variance in the obtained set of activations;
   generating normalization statistics based at least in part on the determined mean and variance; and
   identifying the set of updates to the one or more parameters of the second set of arithmetic units based on the generated normalization statistics, the one or more parameters further comprising normalization criteria and values for one or more normalization layers of the copy of the trained machine learning model utilized by the second set of arithmetic units.

15. A system comprising:
   a first set of arithmetic units having a first precision for floating-point computations;
   a second set of arithmetic units coupled to the first set of arithmetic units, the second set of arithmetic units having a second precision for floating-point computations, the second precision being lower than the first precision; and
   a memory coupled to the second set of arithmetic units;
   the second set of arithmetic units being configured to perform inference on input data stored in the memory utilizing a copy of a machine learning model obtained from the memory, the machine learning model being trained for the first precision for floating-point computations;
   the first set of arithmetic units being configured to tune one or more parameters of the second set of arithmetic units based at least in part on determining a difference between (i) a first set of predictions obtained by performing inference on at least a portion of the input data with the second set of arithmetic units and (ii) a second set of predictions obtained by performing inference on said portion of the input data with one or more arithmetic units having the first precision;
   wherein the first set of arithmetic units is configured to tune the one or more parameters of the second set of arithmetic units to reduce the difference between (i) the first set of predictions obtained by performing inference on said portion of the input data with the second set of arithmetic units and (ii) the second set of predictions obtained by performing inference on said portion of the input data with the one or more arithmetic units having the first precision, the one or more parameters comprising weight and bias values for the copy of the trained machine learning model utilized by the second set of arithmetic units.

16. The system of claim 15, wherein the first precision comprises 32-bit or higher floating-point computations, and the second precision comprises 16-bit or lower floating-point computations.

17. The system of claim 15, wherein the first set of arithmetic units is configured to tune the one or more parameters of the second set of arithmetic units based on normalization statistics determined from a mean and variance of activations in the copy of the trained machine learning model utilized by the second set of arithmetic units to perform inference on said portion of the input data, the one or more parameters further comprising normalization criteria and values for one or more normalization layers of the copy of the trained machine learning model utilized by the second set of arithmetic units.

18. The system of claim 15, wherein at least one of the first set of arithmetic units and the second set of arithmetic units comprise respective floating-point units.

19. The system of claim 15, wherein at least one of the first set of arithmetic units and the second set of arithmetic units comprise respective algorithmic logic units.

20. The system of claim 15, further comprising scratchpad memory coupling the memory, the first set of arithmetic units and the second set of arithmetic units.

\* \* \* \* \*